(12) United States Patent
Lopez et al.

(10) Patent No.: US 9,683,426 B2
(45) Date of Patent: Jun. 20, 2017

(54) DISTRIBUTED INFLOW CONTROL DEVICE

(71) Applicant: HALLIBURTON ENERGY SERVICES, INC., Houston, TX (US)

(72) Inventors: Jean-Marc Lopez, Plano, TX (US); Luke William Holderman, Plano, TX (US); Michael Linley Fripp, Carrollton, TX (US); Liang Zhao, Plano, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 349 days.

(21) Appl. No.: 14/357,060

(22) PCT Filed: Dec. 31, 2012

(86) PCT No.: PCT/US2012/072308
§ 371 (c)(1),
(2) Date: May 8, 2014

(87) PCT Pub. No.: WO2014/105082
PCT Pub. Date: Jul. 3, 2014

(65) Prior Publication Data
US 2015/0337622 A1    Nov. 26, 2015

(51) Int. Cl.
E21B 43/08    (2006.01)
E21B 34/06    (2006.01)
(Continued)

(52) U.S. Cl.
CPC ............ *E21B 34/06* (2013.01); *B23P 15/001* (2013.01); *E21B 34/066* (2013.01); *E21B 43/08* (2013.01);
(Continued)

(58) Field of Classification Search
USPC ..... 166/66.6, 316, 205; 29/890.128, 890.126
See application file for complete search history.

(56) References Cited

U.S. PATENT DOCUMENTS 3,586,104 A    6/1971 Hyde
6,830,104 B2   12/2004 Nguyen et al.
(Continued)

OTHER PUBLICATIONS

Singapore Patent Application No. 11201502879W, Written Opinion, mailed May 17, 2016, 5 pages.
(Continued)

*Primary Examiner* — Taras P Bemko
(74) *Attorney, Agent, or Firm* — Kilpatrick Townsend & Stockton LLP

(57) ABSTRACT

Certain aspects of the present invention are directed to a distributed inflow control device that can be disposed in a wellbore through a fluid-producing formation. The distributed inflow control includes a shroud that can be disposed in the fluid-producing formation. The shroud circumferentially covers a section of a tubing string. The shroud includes a profile having multiple flow paths between the fluid-producing formation and an inner volume of the section of the tubing string. Each flow path restricts a fluid flow through the flow path and is independent of each other flow path. The distributed inflow control device also includes a seal over the profile including the flow paths. The seal causes fluid to flow from an inlet to an outlet of each flow path and prevents fluid from entering or exiting each flow path at a point other than the respective inlet or the respective outlet.

19 Claims, 5 Drawing Sheets

(51) Int. Cl.
*B23P 15/00* (2006.01)
*E21B 43/12* (2006.01)
(52) U.S. Cl.
CPC ......... *E21B 43/12* (2013.01); *Y10T 29/49417* (2015.01); *Y10T 29/49421* (2015.01)

(56) References Cited

U.S. PATENT DOCUMENTS

| | | |
|---|---|---|
| 8,291,976 B2 | 10/2012 | Schultz et al. |
| 2007/0272408 A1 | 11/2007 | Zazovsky et al. |
| 2008/0135255 A1 | 6/2008 | Coronado et al. |
| 2010/0155064 A1 | 6/2010 | Nutley et al. |
| 2011/0139453 A1* | 6/2011 | Schultz .................. E21B 43/12 166/272.3 |
| 2011/0180258 A1 | 7/2011 | Scott et al. |

OTHER PUBLICATIONS

Australian Application No. 2012397810, First Examiner Report mailed on Dec. 5, 2015, 3 pages.
Singapore Application No. 11201502879W, Written Opinion mailed on Jan. 26, 2016, 6 pages.
Canadian Application No. 2,889,822, Office Action mailed on Mar. 15, 2016, 3 pages.
International Patent Application No. PCT/US2012/072308, "International Search Report and Written Opinion" mailed Sep. 23, 2013, 15 pages.
European Patent Application No. 12890766.4, Extended European Search Report, mailed Jul. 21, 2016, 8 pages.
Colombian Patent Application No. 15-125.664, Office Action mailed on Sep. 8, 2016, 19 pages (No English translation available. A summary of the Office Action is provided in the Transmittal Letter submitted herewith).

\* cited by examiner

DISTRIBUTED INFLOW CONTROL DEVICE

CROSS-REFERENCE TO RELATED APPLICATIONS

This is a U.S. national phase under 35 U.S.C. 371 of International Patent Application No. PCT/US2012/072308, titled "Distributed Inflow Control Device," filed Dec. 31, 2012, the entirety of which is incorporated herein by reference.

TECHNICAL FIELD OF THE INVENTION

The present invention relates generally to assemblies for controlling fluid flow in a bore in a subterranean formation and, more particularly (although not necessarily exclusively), to inflow control devices having multiple flow paths that are capable of restricting fluid flow.

BACKGROUND

Various devices can be installed in a well traversing a hydrocarbon-bearing subterranean formation. Some devices control the flow rate of fluid between the formation and tubing, such as production or injection tubing. An example of these devices is an inflow control device. An inflow control device can be used to control and regulate fluid flow from a fluid producing formation. For example, an inflow control device can restrict the rate of flow for fluid produced from a formation. Restricting the rate of flow for fluid produced from a formation can balance production from different portions of the formation (i.e., "production zones") such that if more fluid is being produced from a first production zone than is being produced from a second production zone, production from the second production zone is not overwhelmed by production from the first production zone.

Each inflow control device positioned along a production string provides a single flow path for production fluid. Having a single flow path can increase the risk of production delays resulting from a blockage of an inlet of an inflow control device.

It is desirable to provide an inflow control device having multiple flow paths.

SUMMARY

In one aspect, a distributed inflow control device is provided that can be disposed in a wellbore through a fluid-producing formation. The distributed inflow control device can include a shroud that can be disposed in the fluid-producing formation. The shroud can circumferentially cover a section of a tubing string. The shroud can include a profile having multiple flow paths between the fluid-producing formation and an inner volume of the section of the tubing string. Each flow path can restrict a fluid flow through the flow path. Each flow path is independent of each other flow path. The distributed inflow control device can also include a seal over the profile. The seal can cause fluid to flow from an inlet to an outlet of each flow path and prevent fluid from entering or exiting each flow path at a point other than the respective inlet or the respective outlet.

In another aspect, a flow control assembly is provided that can be disposed in a wellbore through a fluid-producing formation. The flow control assembly includes a distributed inflow control device and a filtering element. The distributed inflow control device can circumferentially cover a section of a tubing string. The distributed inflow control device can be disposed in the fluid-producing formation. The distributed inflow control device includes multiple flow paths that can be between the fluid-producing formation and an inner volume of the section of the tubing string. Each flow path can restrict a fluid flow through the flow path. Each flow path is independent of each other flow path. The filtering element can circumferentially surround the distributed inflow control device.

In another aspect, a method is provided for manufacturing a distributed inflow control device capable of being disposed in a bore. A first rigid material is processed to form a profile including multiple flow paths. A second rigid material is positioned over the profile. The second rigid material is coupled to the first rigid material. Coupling the second rigid material to the first rigid material forms a seal over the profile including the flow paths.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
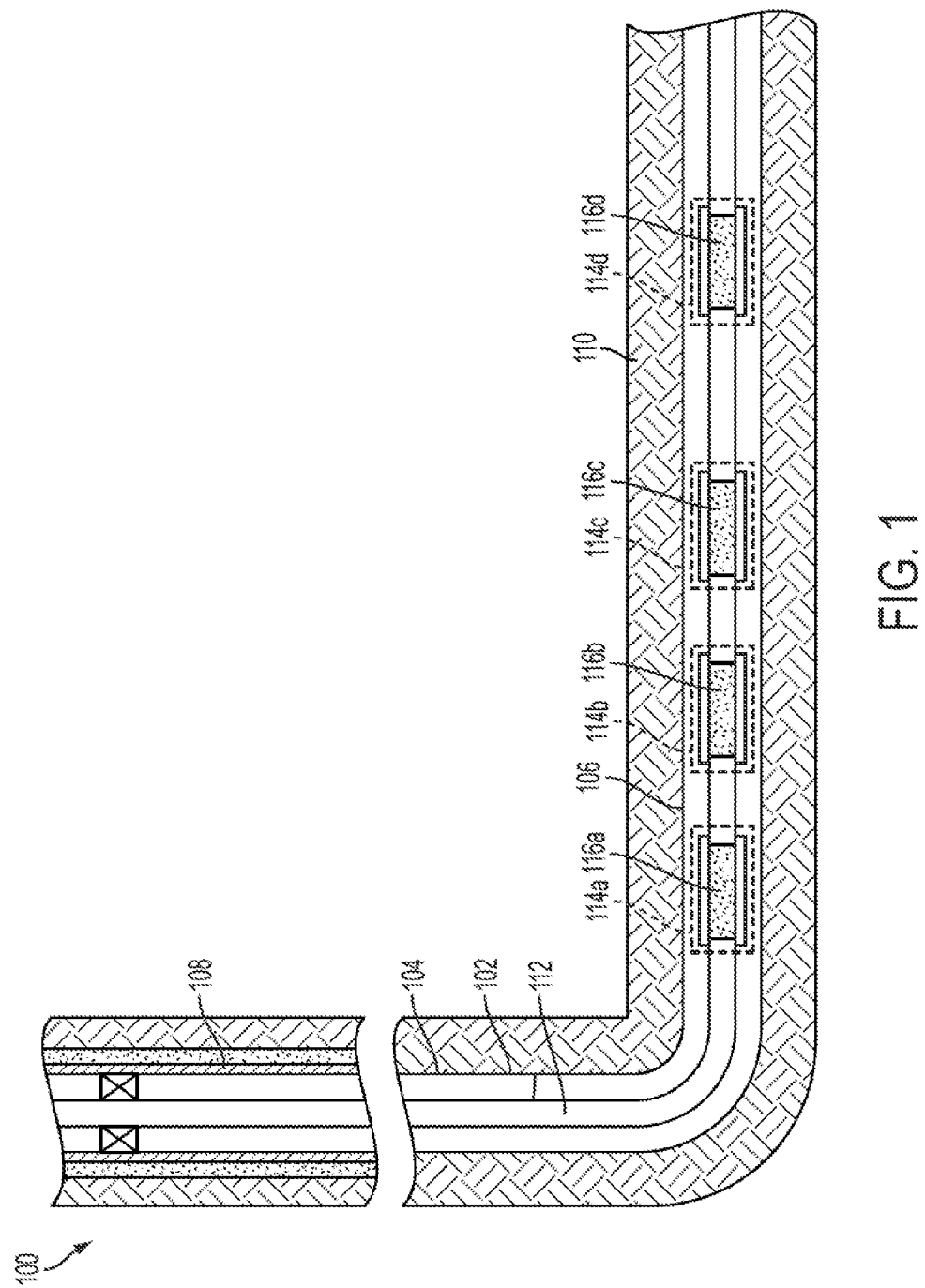
FIG. 1 is a schematic illustration of a well system having a distributed inflow control device according to one aspect of the present invention.

Certain aspects and examples of the present invention are directed to a distributed inflow control device that can be disposed in a wellbore through a fluid-producing formation. The distributed inflow control device can include multiple flow paths, thereby reducing the risk of a blockage in any given flow path preventing the inflow control device from restricting or otherwise regulating fluid flow. The distributed inflow control device can be positioned under a screen or other filtering element. The screen or other filtering element can circumferentially surround or otherwise cover the distributed inflow control device.

In some aspects, the distributed inflow control device can include a shroud that can be disposed in the fluid-producing formation. The shroud can circumferentially cover a joint or other section of a tubing string. The shroud can include a profile. The profile defines multiple, independent flow paths that can be between the fluid-producing formation and an inner volume of the joint. Each flow path can restrict a fluid flow through the flow path. Each flow path can include a separate respective inlet and outlet. The flow paths can thus form a parallel fluidic circuit in which multiple flow paths allow fluid flow in parallel with and independently from one another. Having multiple flow paths provides redundancy such that if one flow path is blocked, a second flow path can allow the flow of fluid through the inflow control device. The distributed inflow control device can also include a seal over the profile of the shroud. The seal can prevent fluid from entering or exiting each flow path at a point other than an inlet or an outlet of the flow path. The seal can thereby cause fluid to flow from the inlet to the outlet of each flow path. In some aspects, the distributed inflow control device can include a first shroud that includes the profile and a second shroud that provides the seal. In one example, an inner shroud having the profile can be circumferentially surrounded or otherwise covered by an outer shroud to form the seal. In another example, an outer shroud having the profile can circumferentially surround or otherwise cover an inner shroud to form the seal.

As used herein, the term "joint" can refer to a length of pipe, such as (but not limited to) drill pipe, casing or tubing. One or more joints can form a tubing section of a tubing string. A joint can have any suitable length. Non-limiting examples of lengths of a joint can include five feet, thirty feet, and forty feet.

As used herein, the term "inflow control device" can refer to any device or equipment for controlling the rate of fluid flow in a well system for extracting fluids from a subterranean formation. An inflow control device can be used to balance inflow throughout the length of a tubing string of a well system by balancing or equalizing pressure from a wellbore of horizontal well. For example, several inflow control devices disposed at different points along a tubing string of a well can be used to regulate the pressure at different locations in the tubing string. A flow control device otherwise used for inflow control can also be used to stimulate production of fluid from a well. For example, a flow control device can be used to inject fluid into the wellbore to stimulate the flow of production fluids, such as petroleum oil hydrocarbons, from a subterranean formation. Such a device can function as an outflow control device and can be referred to as an inflow control device. An inflow control device can be formed from any material suitable for a providing a flow path with a relatively small diameter and a relatively high flow rate. In one non-limiting example, an inflow control device can be formed from a carbide part, such as a carbide knob or carbide tube.

A distributed inflow control device can be used in any suitable well system. A non-limiting example of a suitable well system is a well system for producing gas from a gas well. Producing gas from a gas well can involve high flow velocities that increase the risk of hot spots and screen failures in well system using inflow control devices having a single flow path. A distributed inflow control device that provides multiple flow paths can reduce the flow velocity through any given flow path. Reducing the flow velocity through any given flow path can decrease the risk of hot spots and/or screen failures in well systems for gas producing wells.

The inner shroud can be formed from a rigid material. Non-limiting examples of rigid material include metal, plastics, composites, elastomers, rubbers, ceramic, glasses, and combinations of one or more of these materials. The inner shroud can be processed to form a profile in the rigid material that includes the multiple flow paths. The material can be sufficiently rigid such that the profile that is formed in the material can be persistent or permanent. In some aspects, processing the shroud can include machining the profile into the rigid material by removing the material using a milling machine, a lathe, a drill, a grinder, or other suitable cutting or machining device. In other aspects, processing the shroud can include deforming the rigid material using a press or punching tool to imprint the profile into the rigid material. In other aspects, processing the shroud can include adding additional rigid material to form the profile on the rigid material. Additional rigid material can be added to form the profile via a welding process, a bonding process, or other suitable process. The inner shroud can be welded onto a base pipe to create the flow paths.

In additional or alternative aspects, a distributed inflow control device can include multiple flow paths provided by coiled control lines or other flexible tubes. The distributed inflow control device includes multiple flexible tubes and at least one fastening device. The flexible tubes can circumferentially surround a section of a tubing string disposed in the fluid-producing formation. The flexible tubes can define multiple flow paths. Each flexible tube can provide an independent, parallel flow path between the fluid-producing formation and an inner volume of the section of the tubing string. Each flexible tube can restrict a fluid flow through the flow path. The fastening device can couple the flexible tubes to the section of the tubing string.

The distributed inflow control device having multiple flow paths can provide improved flow distribution as compared to other inflow control devices. The distributed inflow control device can also reduce screen erosion problems for gas wells. The multiple flow paths of the inflow control device can reduce the flow rate at any given point along the screen, thereby decreasing the amount of erosion at different points along the screen.

The distributed inflow control device can also provide improved flow distribution for gravel packing. Gravel packing involves having a continuous fluid return along the length of a screen section. Having all of the fluid returned in a single location can dehydrate the gravel pack at that one location, thereby causing voids in the gravel pack if the gravel pack is dehydrated prematurely. The distributed inflow control devices can reduce the amount of fluid being returned at any given location. Distributing the fluid being returned across multiple locations can reduce or eliminate premature dehydration of the gravel pack, thereby reducing or eliminating voids in the gravel pack.

A distributed inflow control device can be used in either a production direction or an injection direction. For example, a distributed inflow control device can be included in well systems involving steam injection to assist production. Steam injection can include steam assisted gravity drainage ("SAGD"). SAGD involves drilling at least two horizontal wells. One horizontal well is drilled above the other horizontal well. Steam is injected into the upper horizontal well to reduce the viscosity of production fluids (such as heavy oil), thereby causing the production fluids to flow into the lower well. A distributed inflow control device can be used with steam injection processes by injecting steam through the distributed inflow control device into a well. The multiple flow paths of the distributed flow control device can allow steam to be injected in an even, distributed manner to the production fluid in an upper well, thereby increasing the effectiveness of the steam injection process.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "above," "below," "upper," "lower," "upward," "downward," "left," "right," "uphole," "downhole," etc. in relation to the illustrative aspects as they are depicted in the figures, the upward direction being toward the top of the corresponding figure and the downward direction being toward the bottom of the corresponding figure, the uphole direction being toward the surface of the well and the downhole direction being toward the toe of the well. Like the illustrative aspects, the numerals and directional descriptions included in the following sections should not be used to limit the present invention.

FIG. 1 schematically depicts a well system 100 having a tubing string 112 with distributed inflow control devices 116a-d. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

The tubing string 112 within wellbore 102 extends from the surface to the subterranean formation 110. The tubing string can include one or more joints 114a-d that are tubing sections of the tubing string 112. The tubing string 112 can provide a conduit for formation fluids, such as production fluids produced from the subterranean formation 110, to travel from the substantially horizontal section 106 to the surface. Pressure from a bore in a subterranean formation can cause formation fluids, including production fluids such as gas or petroleum, to flow to the surface.

The well system 100 can also include one or more distributed inflow control devices 116a-d. Each of the distributed inflow control devices 116a-d can be coupled to a respective joint 114a-d of the tubing string 112 at a horizontal section 106. The distributed inflow control devices 116a-d can provide distributed flow control along the tubing string 112 as the production fluid flows into a joints 114a-d of the tubing string 112.

Each of the distributed inflow control devices 116a-d can include multiple fluid-restricting paths. The multiple fluid-restricting paths can have any length. In some aspects, the multiple fluid-restricting paths can span the length of a joint 114. The multiple fluid-restricting paths can provide flow restriction and regulation along the length of the joint 114. The distributed inflow control devices 116a-d can replace or supplement inflow control devices having single flow paths that may be positioned at one or more intervals along the tubing string 112.

In some aspects, the flow paths can be helical flow paths or other curvilinear flow paths. The helical or otherwise curvilinear shape of each flow path can restrict the flow of fluid through the path. In other aspects, each flow path includes a variable diode configured to restrict the fluid flow. In other aspects, each of the flow paths can be a straight flow path having respective dimensions (i.e., length and cross-sectional area) sufficient generate fluid friction restricting the fluid flow. The flow paths can be any length suitable for restricting the flow of fluid. In some aspects, each flow path has a respective length equal to a length of the section of the tubing string.

In other aspects, the distributed inflow control device can include multiple control lines or other tubes formed from a suitable flexible material. The flexible tubes can circumferentially surround a joint or other section of a tubing string disposed in the fluid-producing formation. The multiple control lines can provide multiple, independent flow paths. For example, fluid from a formation can flow into a separate inlet for each flexible, coiled control line or other tube and flow out of a separate outlet of each flexible, coiled control line or other tube. The distributed inflow control device can also include at least one fastening device that couples the flexible tubes to the joint.

Although FIG. 1 depicts the distributed inflow control devices 116a-d positioned in the substantially horizontal section 106, a distributed inflow control device can be located, additionally or alternatively, in the substantially vertical section 104. In some aspects, distributed inflow control devices can be disposed in simpler wellbores, such as wellbores having only a substantially vertical section. Distributed inflow control devices can be disposed in openhole environments, such as is depicted in FIG. 1, or in cased wells.

Although FIG. 1 depicts four distributed inflow control devices 116a-d positioned in the tubing string 112, any number of distributed inflow control devices can be used.

Figure 2:
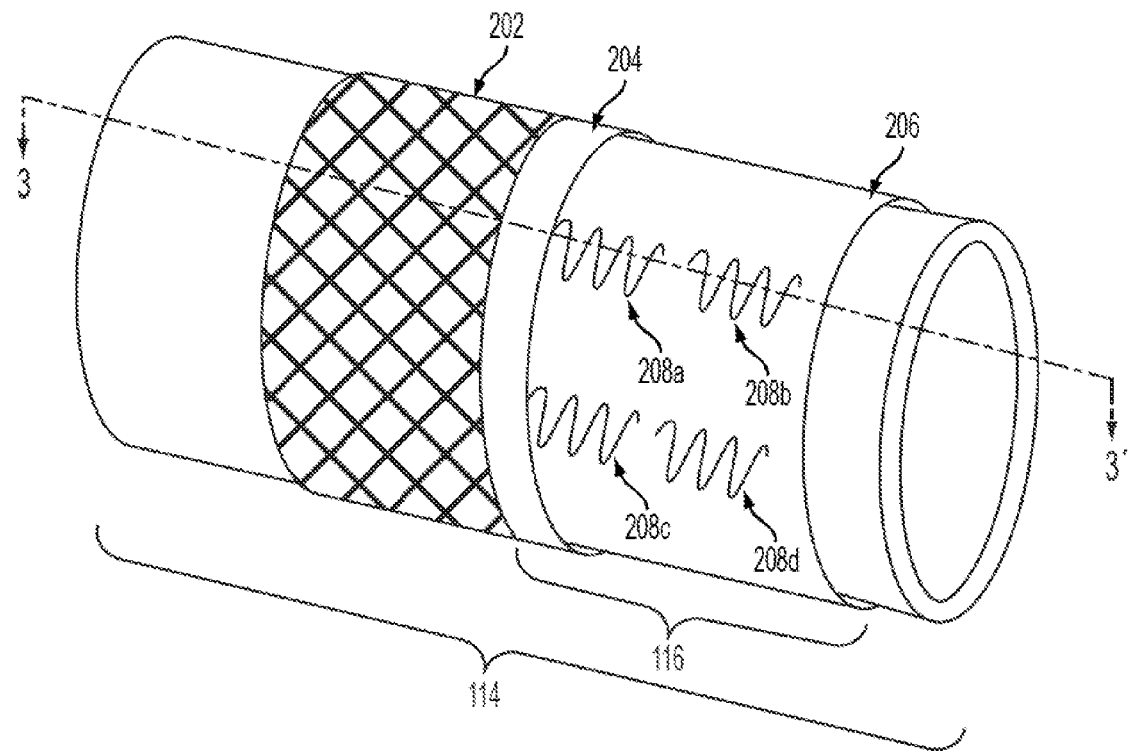
FIG. 2 is a partial perspective view of a joint of a tubing string having a distributed inflow control device with curvilinear flow paths according to one aspect of the present invention.

FIG. 2 is a partial perspective view of a joint 114 of the tubing string 112 having a distributed inflow control device 116 with curvilinear flow paths 208a-d. The partial perspective view of the joint 114 is partially cut away to depict an inner shroud 206 circumferentially surrounding the joint 114 and an outer shroud 204 circumferentially surrounding the inner shroud 206. A sand control device, such as a filtering element 202, can circumferentially surround the outer shroud 204.

The filtering element 202 can include any material, device, or structure suitable for filtering production fluid flowing into the joint via the distributed inflow control device 116. A non-limiting example of a filtering element 202 is a sand screen coupled to sections of a tubing string of a well system. A sand screen can filter particulate material from production fluid by allowing the production fluid to flow through the sand screen and by preventing particulate material in the production fluid from passing through the sand screen. One example of a sand screen is a wire wrapped helically around a perforated piece of pipe. The helically wrapped wire is spaced and/or gauged based on the size of the particles to be filtered. Another example of a sand screen is a mesh filter. A mesh filter can include a group of fibers or other materials that are woven perpendicularly to another group of fibers or other materials, thereby forming pores allowing the flow of fluid through the mesh filter. Another non-limiting example of a filtering element 202 is a porous medium. The porous medium can be a material having one or more pores adapted to allow a fluid to flow through the porous medium and to prevent one or more particles from flowing through the porous medium.

Although the filtering element 202 is depicted as circumferentially surrounding the distributed inflow control device 116, other implementations are possible. In additional or alternative aspects, a filtering element may be positioned in line with the distributed inflow control device.

The curvilinear flow paths 208a-d can be defined by a profile formed in the inner shroud 206. The outer shroud 204 can circumferentially surround the inner shroud 206 such that the outer shroud 204 covers the profile forming the curvilinear flow paths 208a-d. The outer shroud 204 can be coupled to the inner shroud 206 such that a seal is formed over the profile. Forming a seal over the profile can cause fluid to flow from a respective inlet to a respective outlet of each of the curvilinear flow paths 208a-d. Each of the outer shroud 204 and the inner shroud 206 can be formed from a suitable rigid material, such as metal or fiber-reinforced composite materials.

Although FIG. 2 depicts four flow paths defined by the inner shroud 206, any number of flow paths can be used.

Figure 3:
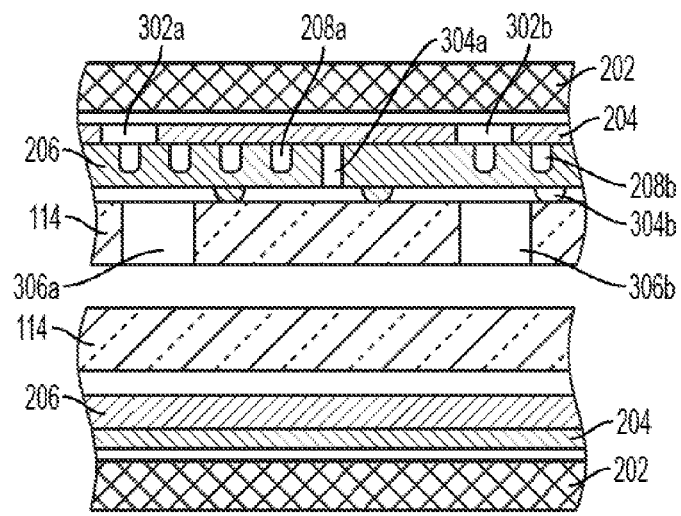
FIG. 3 is a longitudinal cross-sectional view of a joint having a distributed inflow control device with curvilinear flow paths according to one aspect of the present invention.

Production fluid produced from the subterranean formation 110 can enter an inner volume of the joint 114 via the distributed inflow control device 116 as depicted in FIG. 3. FIG. 3 depicts a longitudinal cross-sectional view of the joint 114 having the distributed inflow control device 116 taken along the line 3-3' of FIG. 2. Fluid can flow through the filtering element 202 into the helical flow paths 208a, 208b defined by the inner shroud 206 via inlets defined by the outer shroud 204, such as the openings 302a, 302b through which fluid can flow into the helical flow paths 208a, 208b. The helical shape of each flow path can restrict the flow of fluid through the curvilinear flow paths 208a-d. Including multiple curvilinear flow paths 208a-d can provide redundant flow paths. Providing redundant flow paths may provide a fluid bypass around blockages in either of the openings 302a, 302b.

Production fluid can flow out of the helical flow paths 208a, 208b via outlets of the flow paths, such as the openings 304a, 304b depicted in FIG. 3. Production fluid can flow from the helical flow paths 208a, 208b to an annulus between the joint 114 and the inner shroud 206. Production fluid can flow from the annulus between the joint 114 and the inner shroud 206 into an inner volume of the joint 114 of the tubing string 112 via the openings 306a, 306b in the joint 114.

Figure 4:
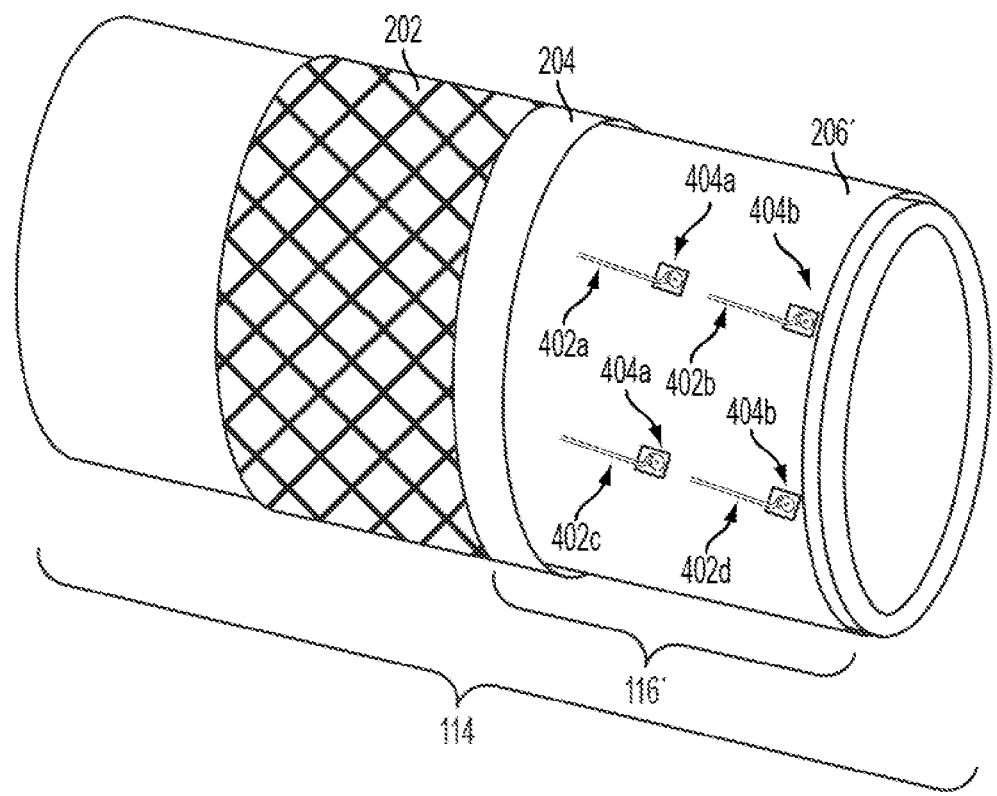
FIG. 4 is a partial perspective view of a joint of a tubing string having a distributed inflow control device with flow paths that restrict fluid flow via variable diodes according to one aspect of the present invention.

In additional or alternative aspects, an inner shroud may define fluid paths that include diodes for restricting or otherwise regulating fluid flow. FIG. 4 is a partial perspective view of a joint 114 of a tubing string 112 having a distributed inflow control device 116 with flow paths 402a-d that restrict fluid flow via variable diodes 404a-d. The partial perspective view of the joint 114 is partially cut away to depict the inner shroud 206' circumferentially surrounding the joint 114 and the outer shroud 204 circumferentially surrounding the inner shroud 206'. The inner shroud 206' can be formed to define flow paths 402a-d that restrict fluid flow via variable diodes 404a-d.

Figure 5:
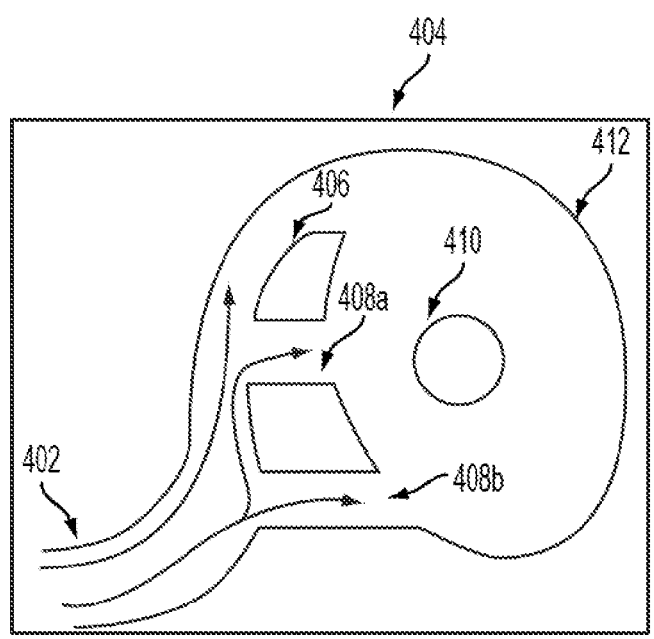
FIG. 5 is a cross-sectional view of a variable diode defined by an inner shroud according to one aspect of the present invention.

FIG. 5 is a cross-sectional view of a variable diode 404 defined by the inner shroud 206'. A variable diode may include multiple flow paths to a vortex chamber having an exit opening. Fluid can flow into the diode 404 via the flow path 402. Diode flow paths 408a, 408b may guide fluid to flow into a vortex 410 in the vortex chamber 412. An additional diode flow path 406 may guide fluid into the vortex 410 in the vortex chamber 412 along a longer flow path than the flow paths 408a, 408b. Production fluid such as oil may flow into vortex via the flow paths 408a, 408b. Unwanted production fluid, such as water, may flow into the flow path 406, thereby reducing the amount of unwanted production fluids in a flow path having a majority of production fluids such as oil.

Although FIGS. 2 and 4 depict the inner shroud 206 circumferentially surrounding the joint 114, other implementations are possible. For example, the inner shroud 206 can partially surround or otherwise cover the joint 114.

Although FIGS. 2 and 4 depict the outer shroud 204 circumferentially surrounding the inner shroud 206, other implementations are possible. For example, the outer shroud 204 can partially surround or otherwise cover the inner shroud 206.

Although FIGS. 2 and 4 depict the inner shroud 206 having a profile including multiple flow paths, other implementations are possible. For example, the profile including the flow paths may be defined in an outer shroud 206. The outer shroud surrounding or covering an inner shroud 204 can form a seal over the profile.

Figure 6:
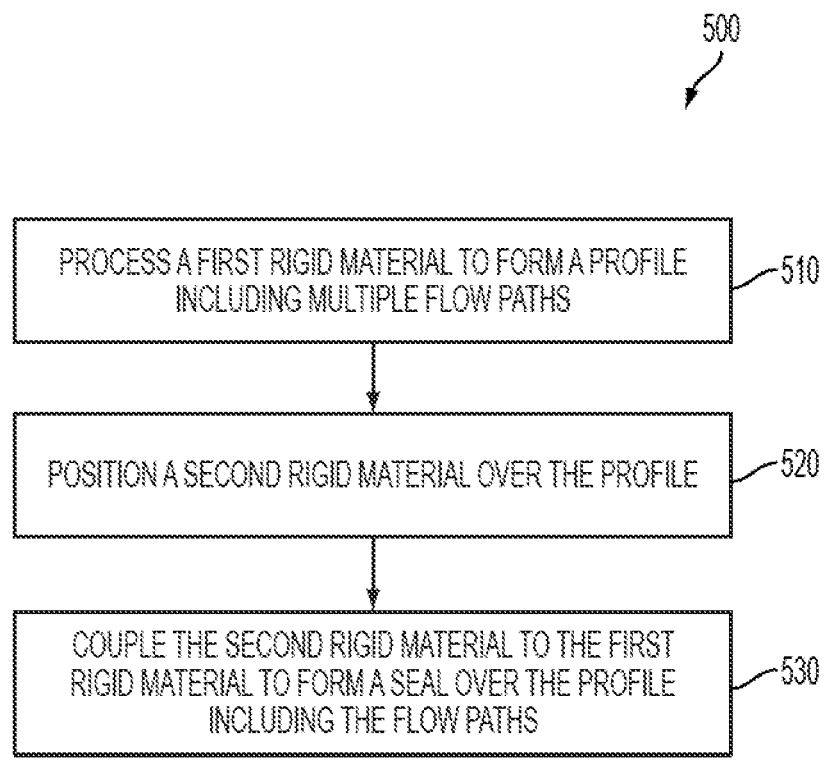
FIG. 6 is a flow chart illustrating an example method for manufacturing a distributed inflow control device capable of being disposed in a bore according to one aspect of the present invention.

A distributed inflow control device having multiple flow paths defined by an inner shroud and an outer shroud can be formed via any suitable manufacturing process. For example, FIG. 6 is a flow chart illustrating an example method 500 for manufacturing a distributed inflow control device.

The method 500 involves processing a first rigid material to form a profile including multiple flow paths, as shown in block 510. A deformable metal or any other suitable rigid material may be processed to form an inner shroud. Processing the rigid material to form a profile in the inner shroud can include any suitable process for defining the profile in the rigid material. In some aspects, a milling machine tool can cut the profile into the metal or other rigid deformable material forming the inner shroud. In other aspects, a press machine tool can punch, press, or otherwise imprint the profile into the metal or other rigid deformable material forming the inner shroud. In some aspects, the profile can include helical flow paths. In other aspects, the profile can include flow paths restricting fluid flow via diodes in the flow paths.

The method 500 further involves positioning a second rigid material over the profile, as shown in block 520. Any suitable metal or other rigid material may be selected as an outer shroud to be formed from the second rigid material.

The method 500 further involves coupling the second rigid material to the first rigid material such that a seal is formed over the profile including the flow paths, as shown in block 530. Any suitable process may be used to couple the outer shroud formed from the second rigid material to the inner shroud formed from the first rigid material and having the profile. For example, the inner shroud may be coupled to the outer shroud by welding or otherwise bonding the inner shroud to the outer shroud. Coupling the outer shroud formed from the second rigid material to the inner shroud formed from the first rigid material can seal the profile such that fluid can enter each flow path from a respective inlet and be guided to a respective outlet of the respective flow path.

Figure 7:
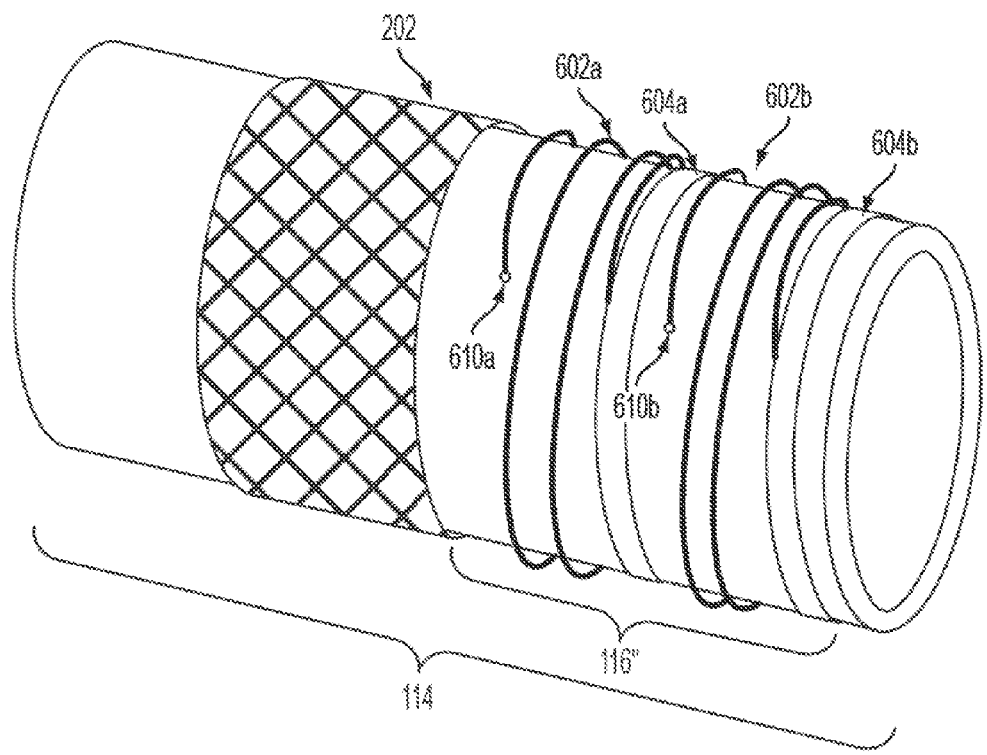
FIG. 7 is a partial perspective view of a joint having a distributed inflow control device including the coiled control lines according to one aspect of the present invention.
Figure 8:
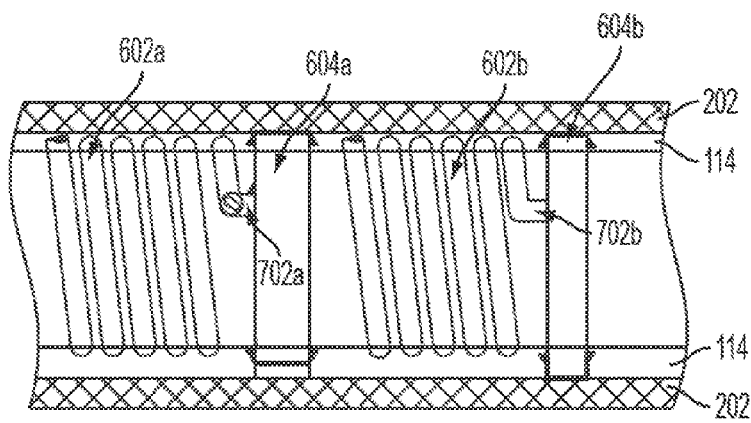
FIG. 8 is a partial lateral view of a joint having a distributed inflow control device including the coiled control lines according to one aspect of the present invention.

In additional or alternative aspects, the flow paths of a distributed inflow control device can be implemented using coiled control lines or other tubes formed from a suitable flexible material. For example, FIGS. 7 and 8 depict a distributed inflow control device 116" with flow paths provided by coiled control lines 602a, 602b. FIG. 7 is a partial perspective view of a joint 114 that is partially cut away to depict the coiled control lines 602a, 602b. FIG. 8 is a partial lateral view of a joint 114 of a tubing string 112 that is partially cut away to depict the coiled control lines 602a, 602b.

As depicted in FIGS. 7 and 8, the coiled control lines 602a, 602b can circumferentially surround the joint 114. The filtering element 202, can circumferentially surround the coiled control lines 602a, 602b. The coiled control lines 602a, 602b can be coupled to the joint 114 via any suitable fastening devices, such as connectors 604a, 604b circumferentially surrounding the joint 114.

Production fluid can flow from formation 110 through the filtering element 202 and into inlets (such as the openings 610a, 610b) for each flow path provided by the coiled control lines 602a, 602b. Positioning the coiled control lines 602a, 602b to circumferentially surround the joint 114 can restrict the flow of production fluid through the coiled control lines 602a, 602b. Fluid can flow from the coiled control lines 602a, 602b into an inner diameter of the joint 114 via ports 702a, 702b. In some aspects, the ports 702a, 702b can be integral with and defined by the connectors 604a, 604b. In other aspects, the ports 702a, 702b can be separate components coupled to the connectors 604a, 604b.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A distributed inflow control device configured for being disposed in a wellbore through a fluid-producing formation, the distributed inflow control device comprising:
   a shroud adapted to circumferentially cover a section of a tubing string and to be disposed in the fluid-producing formation, wherein the shroud comprises a profile including a plurality of flow paths that are adapted to be between the fluid-producing formation and an inner volume of the section of the tubing string, wherein each flow path of the plurality of flow paths is configured to restrict a fluid flow through the flow path and is independent of each other flow path, wherein the plurality of flow paths comprises a plurality of respective inlets and a plurality of respective outlets;
   a seal over the profile including the plurality of flow paths, to cause fluid to flow from a respective inlet to a respective outlet of each flow path and to prevent fluid from entering or exiting each flow path at a point other than the respective inlet or the respective outlet; and
   a plurality of coiled control lines adapted to circumferentially surround the section of the tubing string for being disposed in the fluid-producing formation, the plurality of coiled control lines defining an additional plurality of flow paths positionable between the fluid-producing formation and the inner volume of the section of the tubing string, wherein each coiled control line of the plurality of coiled control lines is adapted to provide a respective flow path independent from each other flow path and is configured to restrict the fluid flow through the flow path.

2. The distributed inflow control device of claim 1, wherein the seal comprises an additional shroud configured for circumferentially covering the shroud.

3. The distributed inflow control device of claim 1, wherein the plurality of flow paths comprises a plurality of curvilinear flow paths.

4. The distributed inflow control device of claim 1, wherein each flow path comprises a variable diode configured to restrict the fluid flow.

5. The distributed inflow control device of claim 1, wherein the plurality of flow paths comprises a plurality of straight flow paths, each straight flow path of the plurality of straight flow paths having a respective dimension configured to generate a fluid friction restricting the fluid flow.

6. The distributed inflow control device of claim 1, wherein the distributed inflow control device is configured to be coupled to a filtering element circumferentially surrounding the distributed inflow control device.

7. The distributed inflow control device of claim 1, wherein the distributed inflow control device is configured to be coupled to a filtering element in line with the distributed inflow control device.

8. The distributed inflow control device of claim 1, wherein the shroud is configured to be formed by processing a rigid material to form the profile including the plurality of flow paths.

9. The distributed inflow control device of claim 1, wherein the plurality of flow paths comprises a parallel fluidic circuit.

10. The distributed inflow control device of claim 1, further comprising:
    at least one fastening device configured to couple the plurality of coiled control lines to the section of the tubing string.

11. A flow control assembly configured for being disposed in a wellbore through a fluid-producing formation, the flow control assembly comprising:
    a section of a tubing string positionable in the wellbore; and
    a plurality of control lines (i) positionable between the fluid-producing formation and the section of the tubing string and (ii) adapted to define a plurality of flow paths forming a distributed inflow control device that includes inlets and ports between the fluid-producing formation and the inner volume of the section of the tubing string, each flow path of the plurality of flow paths being (i) configured to restrict fluid flow through the flow path between an inlet and a port and (ii) independent of each other flow path.

12. The flow control assembly of claim 11, further comprising:
    at least one fastening device configured to couple the plurality of control lines to the section of the tubing string.

13. The flow control assembly of claim 12, wherein the at least one fastening device comprises a plurality of connectors.

14. The flow control assembly of claim 13, wherein the ports are integral with the plurality of connectors.

15. The flow control assembly of claim 13, wherein the ports are separate components from the plurality of connectors but are coupled to the plurality of connectors.

16. The flow control assembly of claim 11, further comprising a filtering element configured for circumferentially surrounding the distributed inflow control device and for providing fluid flow to the inlets for the plurality of control lines.

17. The flow control assembly of claim 11, wherein the inlets and the ports are positioned to restrict the fluid flow through the plurality of flow paths in a common direction along a length of the distributed inflow control device.

18. The flow control assembly of claim 11, wherein the plurality of control lines is a plurality of coiled control lines that circumferentially surround the section of the tubing string.

19. The flow control assembly of claim 18, wherein the section of the tubing string is a joint.

* * * * *